2,962,479
METHOD OF THE CROSS-LINKING POLYMERS

Clyde Lee Aldridge, Baton Rouge, La., and Richard D. Gilliom, Cambridge, Mass., assignors to Esso Research and Engineering Company, a corporation of Delaware No Drawing. Filed May 16, 1958, Ser. No. 735,703

3 Claims. (Cl. 260—73)

This invention relates to cross-linking or curing unsaturated homopolymers and copolymers in the presence of a hydrocarbon solvent, a halogenated hydrocarbon, an acid catalyst and an aldehydic material. More particularly, the present invention relates to curing copolymers of 0.5 to 100 parts by weight of a $C_4$ to $C_{14}$ multiolefin such as butadiene, isoprene, piperylene, dimethylbutadiene, dimethallyl, allo-ocymene, myrcene, vinyl fulvenes or the like with 0 to 99.5 parts by weight of either a mono olefinic compound either having a cyclic nucleus such as styrene, alpha methyl styrene, chloro styrene, indene, dihydronaphthalene or the like and/or preferably $C_4$ to $C_8$ isoolefins such as 2-methyl-1-butene, 3-methyl-1-butene or especially isobutylene. Such copolymers are cured, according to the present invention, in the presence of a Friedel-Crafts catalyst, a $C_4$ to $C_{10}$ hydrocarbon solvent, a $C_1$ to $C_{10}$ aldehyde and either a $C_1$ to $C_3$ alkyl halide or chloroform.

One copolymer which is advantageously cured, according to the present invention into a material useful as a softener for asphalt, is butyl rubber. Butyl rubber is the copolymer of isobutylene with a multiolefin prepared at low temperatures with a Friedel-Crafts catalyst. The minor component is a multiolefin having from 4 to 12, or 14 carbon atoms. The preferred multiolefins are butadiene, isoprene, piperylene, dimethallyl, myrcene, allo-ocymene and the like. Of these materials, isoprene is regarded as the most suitable multiolefin. The isobutylene and the multiolefin are mixed in the ratio of a major proportion of isobutylene and a minor proportion of isoprene, the preferred range being 1 to 10 parts isoprene and 99 to 90 parts isobutylene. High purity is desirable in both materials and it is preferable to use an isobutylene of at least 99% purity, although satisfactory copolymers can be made of materials of considerably lower purity. The mixture of monomers is cooled to a temperature within the range of between —40° C. and —164° C., the preferred range being between —78° C. and —103° C. The material may be cooled by the use of a refrigerating jacket upon the mixing tank and polymerizer, in which case any refrigerant which will yield the desired temperature is satisfactory. Alternatively, the cooling may be obtained by an internal refrigerant which is mixed directly with the olefinic copolymerizate. For this purpose, such materials as liquid propane, solid carbon dioxide, liquid ethane and liquid ethylene are satisfactory. In some instances, liquid methane may be employed, although usually the temperature of boiling liquid methane is undesirably low.

The cold mixture is then polymerized by the addition of a Friedel-Crafts catalyst, preferably in a liquid or dissolved form. Ordinarily an amount of catalyst ranging from 0.15% to about 1.0% of the weight of the mixed olefins is required to polymerize them into a high molecular weight polymer. A partial copolymerization may be obtained by limiting the quantity of catalyst added.

In the polymerization reaction, the liquid catalyst may be sprayed on to the surface of the rapidly stirred, cold olefinic material, or a small high pressured stream of catalyst may be directed into the body of the rapidly stirred mixture. In both processes powerful and efficient stirring is needed to disperse the catalyst into the mixture.

The polymerization proceeds rapidly to a yield of the desired polymer which precipitates out from the solution in the form of a flocculent white solid having many of the physical characteristics of raw gum rubber. When the polymerization has reached the desired stage, the material is conveniently recovered by discharging the whole mixture into warm water which may contain an alcohol, or some other compound, to inactivate the catalyst. The warm water serves the purpose of flashing off the excess refrigerant, the unpolymerized olefins and catalyst solvent. The polymer is then recovered from the water suspension by any convenient manner, such as straining or filtering, or otherwise as may be convenient. The polymer is then dried either as a blanket passing through a tunnel drier or on a mill.

The product is a plastic and elastic material. It has a Staudinger molecular weight within the range between about 35,000 and 90,000 the minimum useful molecular weight being about 20,000 and the preferred range between about 45,000 and 60,000. The rubber has a Wijs iodine number between about 1 and 20, and a maximum iodine number of about 50, the preferred iodine number being about 7 to 15. The rubber materials may contain pigments, reinforcing agents, softeners, vulcanizers, accelerators, anti-oxidants, or other compounding ingredients.

The invention is also particularly adapted to processes for the curing of drying oils made by the copolymerization of butadiene and styrene into rubbery masses useful as molded articles of manufacture. Thus the invention has specific application to the preparation of drying oils by polymerizing 75 to 100 parts of butadiene with 25 to 0 parts of styrene, preferably about 75 to 85 parts of the former and 25 to 15 parts of the latter, the polymerization being carried out at 20°–100° C., preferably between 40° and 90° C., in a reaction diluent. As a polymerization catalyst about 1.5 to 10 parts, preferably about 1.5 to 3 parts of a finely divided metallic sodium and/or potassium and/or lithium or the like catalyst is used in the optional presence of various polymerization modifiers which tend to promote the reaction and produce colorless products of more reproducible drying rates. As an inert reaction diluent it is desirable to use, for example, a naphtha of boiling range between about 90°– 180° C. or straight run mineral spirits such as Varsol (boiling range 150°–200° C.) or inert hydrocarbon diluents boiling between +20° C. and 200° C. such as pentane, xylene, toluene, benzene, cyclohexane or the like, individually or in admixture with each other. The diluents are usually used in amounts ranging from 50 to 500, preferably 150 to 300, parts per 100 parts of monomers. Various ethers having more than two carbon atoms per molecule such as diethyl ether, acetal, dioxane, vinyl ethyl ether, vinyl isobutyl ether, t-butyl methyl ether and methylal, are also useful as diluents and are particularly helpful as co-diluents to insure formation of colorless products when used in amounts ranging from about 10 to 35 parts per 100 parts of monomers, together with the aforesaid amount of inert diluent such as solvent naphtha. Other means of modifying the polymer properties involve the substitution of all or part of the butadiene feed with other diolefins such as isoprene, piperylene, 2,3-dimethyl butadiene - 1,3, or 2 - methyl-pentadiene - 1,3. Also, instead of styrene, various ring substituted alkyl styrenes such as p-methyl styrene or p-ethyl styrene or the dimethyl styrenes may be used.

Especially where a relatively coarse dispersion of sodium is used as catalyst, it is also advantageous to use about 1 to 50 weight percent, preferably 10 to 20 weight percent based on sodium of a $C_1$ to $C_5$ aliphatic alcohol. Secondary and tertiary alcohols, particularly isopropanol or tertiary butanols are preferred. Such alcohols act as polymerization promotors. Conversions of 50 to 100 percent on monomers are readily realized in batch as well as in continuous polymerization, although the catalyst requirements are greater for continuous than for batch operation.

In practicing the present invention polymers of the type described above are cured at 0°–200° C. and preferably at 20°–100° C. by a combination of Friedel-Crafts catalyst such as aluminum chloride, aluminum ethoxy chloride, boron trifluoride or especially boron trifluoride etherate; a $C_5$ to $C_8$ hydrocarbon solvent; a $C_1$ to $C_3$ aldehyde; and either a $C_1$ to $C_3$ alkyl halide and/or chloroform. Per 100 parts by weight of unsaturated polymer, about 0.1 to 20 parts by weight of acid catalyst e.g., Friedel-Crafts catalyst are employed, although advantageously 0.5 to 15 and preferably 2 to 8 parts by weight of such catalyst are used. The amount of hydrocarbon solvent is generally between 150–2000 parts by weight, advantageously 300–1500 parts by weight and preferably 400–800 parts by weight. The amount of halogenated hydrocarbon such as alkyl halide or chloroform is generally 0.5–100 parts by weight, advantageously 1–80 parts by weight, and preferably 5–70 parts by weight. The amount of aldehydic material such as a $C_1$ to $C_3$ aldehyde is generally about 0.1–10 parts by weight, advantageously about 0.3–8 parts by weight and preferably about 1–5 parts by weight. The curing reaction generally takes about 0.1 minute to 10 days or more depending upon the temperature employed, although, curing times of about 1–60 minutes are preferred.

In order to more fully illustrate the present invention, the following experimental data are given.

EXAMPLE I

Run A.—100 grams of a butyl rubber having Mooney viscosity (212° F. at 8 minutes) of 75, a viscosity average molecular weight of 320,000 and a mole percent unsaturation of 2.5 were dissolved in 850 ccs. of chloroform. This was charged to a 3 necked flask fitted with a stirrer and a dropping funnel. A complex, made by heating 5.3 grams of boron trifluoride etherate, 3.2 grams of paraformaldehyde and 50 ccs. of chloroform was added with stirring under nitrogen. This was stirred at room temperature for 7 hours under the nitrogen and then allowed to stand overnight. The butyl rubber was then precipitated with acetone and redissolved in n-hexane. This was washed with 5% NaOH, and then with water until neutral to litmus, and subsequently precipitated with acetone. The butyl rubber was then dried for 22 hours at 66° C. under 20 inches of vacuum. No noticeable change occurred, the product having its original viscosity average molecular weight of 320,000.

Run B.—The same general procedure was repeated employing 665 grams of a 15% butyl rubber solution in hexane which was charged into equipment like that used in Example I. 5.4 grams of boron trifluoride etherate and 2.3 grams of paraformaldehyde were added and the mixture stirred for 9 minutes. After 66 hours no noticeable change had occurred, the product having its original viscosity average weight of 320,000.

Run C.—In accordance with the present invention there was then added to the composition of Run B, 5.7 grams of chloroform with stirring under nitrogen. The viscosity was immediately greater (e.g., after 5 minues) and after washing the product with acetone and drying at 60° C. under 24 inches of vacuum, the dried polymer was found to be definitely cross linked or cured since it was insoluble in diisobutylene and tetralin, so the molecular weight could not be determined.

The above data show that only by a combination of a hydrocarbon solvent, a halogenated hydrocarbon, an aldehyde, and an acid catalyst are the unsaturated polymers of the invention effectively cured in accordance with the invention.

EXAMPLE II

Run D.—710 grams of a 15% solution in hexane of the butyl rubber of Example I were charged to equipment like that used in Example I. To this was added with stirring under nitrogen 7.1 grams of boron trifluoride etherate dissolved in 65.1 grams of chloroform. After stirring 25 minutes no change in viscosity was noticed.

Run E.—There was then added in accordance with the present invention 3.8 grams of paraformaldehyde dissolved in 39.7 grams of chloroform. Five minutes after this addition a very viscous mass had formed which was washed with isopropanol and dried under 60° C. under 24 inches of vacuum. The dried polymer was completely cross linked or cured since it was completely insoluble in diisobutylene and tetralin and thus its molecular weight could not be determined.

The same general conclusions apply as in Example I.

EXAMPLE III

Run F.—670 grams of a 15% butyl rubber solution as in Example I in hexane was charged to equipment like that used in Example I. To this was added with stirring under nitrogen 3.2 grams of paraformaldehyde in 34.1 grams of chloroform. Stirring was continued for 24 minutes with no change in viscosity.

Run G.—In accordance with the present invention 5.4 grams of boron trifluoride etherate in 34.1 grams of chloroform was then added with stirring. Within 8 minutes the viscosity markedly increased and after 2 minutes more the resulting cured copolymer was washed with isopropanol and dried at 60° C. under 24 inches of vacuum. The dried polymer was completely cured or cross linked since it was completely insoluble in diisobutylene and tetralin and thus the molecular weight could not be determined.

The same general comments apply in this example as in Example I.

EXAMPLE IV

In accordance with the present invention 670 grams of a 15% butyl rubber solution in hexane as in Example I was charged to equipment similar to that used in Example I. 6.6 grams of boron trifluoride etherate and 3.8 grams of paraformaldehyde in 57.8 grams of chloroform was added with stirring under nitrogen. As the addition was started, the butyl rubber started coming out of solution. By the end of the addition time of 7 minutes, he entire mass was very viscous. This was washed with isopropanol and dried at 60° C. under 20 inches of vacuum. The dried polymer was definitely cured since it was completely insoluble in diisobutylene and tetralin and thus the molecular weight could not be determined. The foregoing experiments are summarized in Table I.

Table I.—Curing butyl rubber

| Example No. | Treatment at Room Temperature | | Approx. Reaction Time | Remarks | Product Viscosity, M.W. |
|---|---|---|---|---|---|
| | Initial Mixture | Components Added | | | |
| | Butyl rubber without treatment. | | | | 320,000. |
| I(a) | Butyl, hexane, BF₃ etherate, paraformaldehyde. | | 22 hrs | No noticeable change. | 320,000. |
| I(b) | Butyl, hexane, BF₃ etherate, paraformaldehyde. | None | 66 hrs | do | 320,000. |
| | | (c) Chloroform | 5 min | Product cured | Too high to measure. |
| II(d) | Butyl, hexane, paraformaldehyde, chloroform. | None | 25 min | No noticeable change. | 320,000. |
| | | (e) Paraformaldehyde in chloroform. | 5 min | Product cured | Too high to measure. |
| III(f) | Butyl, hexane | None | 24 min | No noticeable change. | 320,000. |
| | Paraformaldehyde, chloroform. | (g) BF₃ etherate in chloroform. | 8 min | Product cured | Too high to measure. |

EXAMPLE V

A solution of 102 grams of a copolymer oil of 80 weight percent butadiene and 20 weight percent styrene in 312 grams of hexane was charged to equipment like that used in Example I. In accordance with the invention, 6.0 grams of boron trifluoride etherate and 5.3 grams of paraformaldehyde in 34.9 grams of chloroform were added with stirring under nitrogen. Stirring was continued for one hour at which time acetone was added which precipitated out as a rubbery solid. This solid was dried for 3 hours under 24 inches of vacuum and then completely dried in a forced air oven at 210° F. overnight. The second drying caused the rubbery solid to become somewhat harder but not to lose its rubbery characteristics.

Resort may be had to modifications and variations of the disclosed embodiments of the invention without departing from the spirit of the invention or the scope of the appended claims.

What is claimed is:

1. A method of curing unsaturated polymers chosen from the group consisting of a copolymer of isobutylene with a minor proportion of a multi-olefin containing from 4 to 14 carbon atoms, and a copolymer of 75 to 100 parts by weight of butadiene, and 0 to 25 parts by weight of styrene which comprises contacting the polymer at a temperature between 0° and 200° C. with a mixture of 0.1 to 20 parts by weight of a Friedel-Crafts catalyst per 100 parts by weight of said copolymer, 150 to 2,000 parts by weight of a $C_5$ to $C_8$ hydrocarbon solvent, 0.5 to 100 parts by weight of chloroform, and 0.1 to 10 parts by weight of paraformaldehyde.

2. A method according to claim 1 in which the Friedel-Crafts catalyst is boron trifluoride etherate.

3. A method according to claim 1 in which the hydrocarbon solvent is hexane.

References Cited in the file of this patent

UNITED STATES PATENTS

| | | |
|---|---|---|
| 2,557,641 | Dudley | June 19, 1951 |
| 2,560,164 | Garber | July 10, 1951 |
| 2,649,431 | Little | Aug. 18, 1953 |